C. F. JENKINS.
MACHINE FOR MAKING TUBES.
APPLICATION FILED JULY 23, 1908.
964,162.
Patented July 12, 1910.
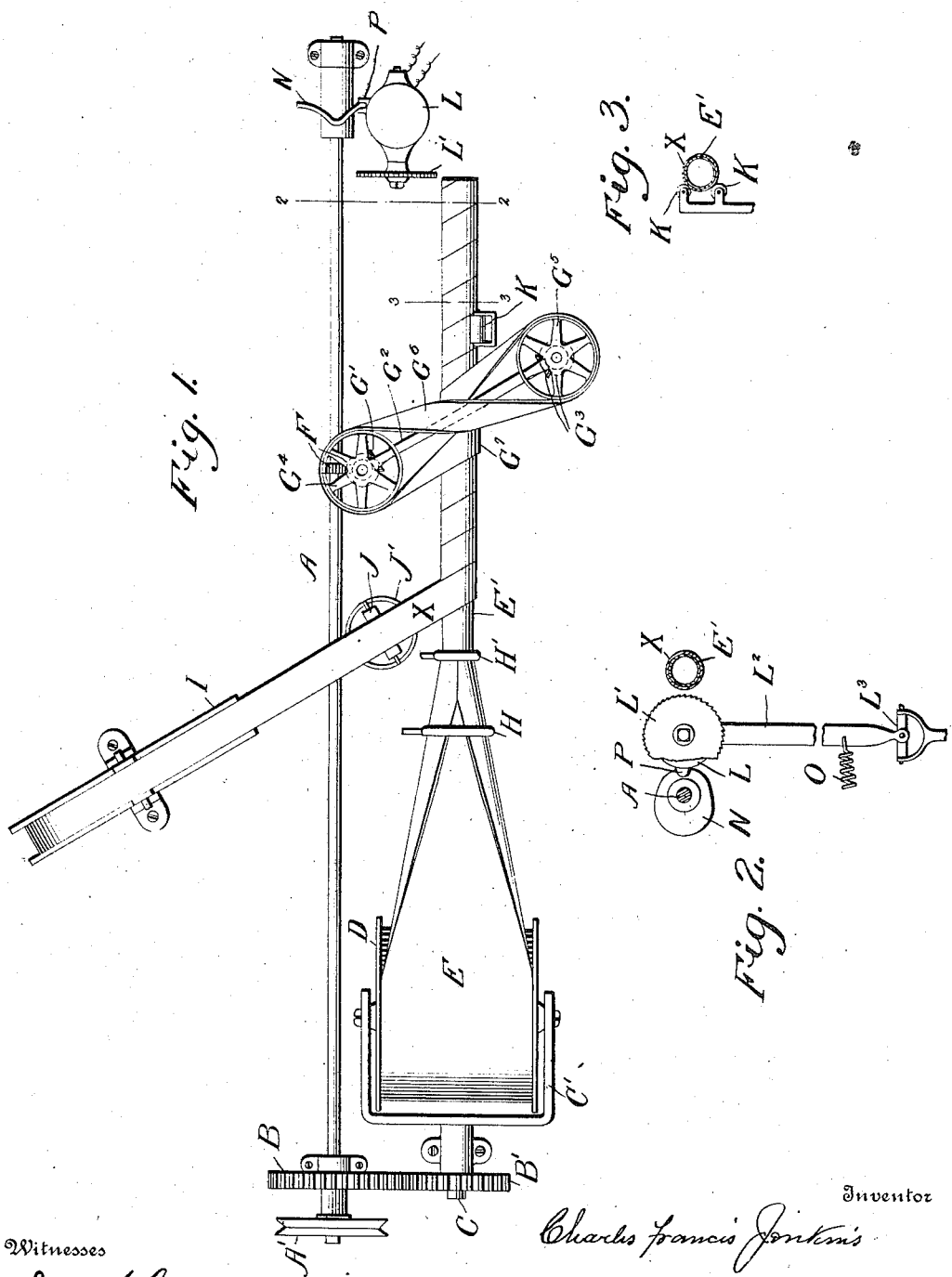

UNITED STATES PATENT OFFICE.

CHARLES FRANCIS JENKINS, OF WASHINGTON, DISTRICT OF COLUMBIA, ASSIGNOR, BY MESNE ASSIGNMENTS, TO SINGLE SERVICE PACKAGE CORPORATION OF AMERICA, A CORPORATION OF NEW JERSEY.

MACHINE FOR MAKING TUBES.

964,162.

Specification of Letters Patent. Patented July 12, 1910.

Application filed July 23, 1908. Serial No. 444,945.

*To all whom it may concern:*

Be it known that I, CHARLES FRANCIS JENKINS, a citizen of the United States, residing at Washington, in the District of Columbia, have invented certain new and useful Improvements in Machines for Making Tubes, of which the following is a specification, reference being had therein to the accompanying drawing.

The leading objects of this invention are to provide a machine for making continuous tubes, especially paper tubes, from sheet stock without the use of a mandrel, and to provide automatic devices for cutting such tubes into desired lengths while they are being advanced by the forming mechanism.

In the accompanying drawings: Figure 1 is a plan view of those parts of the machine which involve novelty; Fig. 2 is a section on the line 2—2, Fig. 1; Fig. 3 is a section on the line 3—3, Fig. 1.

In these figures A represents a suitably mounted shaft driven by any suitable means, for example, a belt pulley A'. This shaft by means of gears B B' drives a parallel shaft C having at its end a fork C' in which is revolubly mounted a transverse spool D to carry a heavy stock strip E, wide enough to form, when laterally rolled, a tube E' of a desired size. The shaft A also drives by means of spiral gears F, or other suitable devices, gears G', shaft G², gears G³, two pulleys G⁴ G⁵, carrying a common strip-winding, oblique, endless belt G⁶ having in one fold the usual winding and feeding loop or bight G⁷ midway between the end planes of the spool D and preferably also approximately in a plane tangent to that spool. Between the spool and said bight are fixed two smooth rings, H, H' at some distance apart, the smaller and more distant from the spool having its inner diameter approximately equal to that of the inner layer of the tube to be formed. The free end of the strip E being drawn out and rolled laterally to tubular form is passed through the two rings and the bight of the belt. A narrow, preferably thin stock strip X mounted on an oblique spool I is drawn forward over a gumming roll J mounted in a receptacle J' and is wound closely around the foundation tube E' and has its end caught under that portion of the belt forming the bight. If now the power shaft be rotated the entire stock is automatically formed into a two-ply tube, the rings continually forming the inner or foundation layer and the bight of the belt continually drawing out and winding thereon the gummed strip and at the same time feeding forward the formed tube. The formed tube is held against the slight lateral pull of the belt by means of rollers K, and if the inner layer is stiff enough to withstand moderate compression, the operation is entirely successful.

For certain purposes it is desirable to cut the advancing completed tube into short segments, and this is done by a small electric motor L having its shaft parallel to the tube and bearing upon its projecting portion a rotary, preferably toothed cutter L'. The motor is mounted upon a support L² hinged at L³ by a gimbal joint to swing toward and away from the tube to carry the cutter into and out of contact, and also to swing in planes parallel to the tube. Both movements are produced at proper times by a cam N upon the shaft A and a spring O, which urges the motor away from the tube. The periphery of the cam is unequally distant from the shaft and as it rotates it pushes the same into action, while the spring draws it out of action as soon as the cam permits. The cam's margin rotates between lugs P upon the motor and lateral bends in the cam force the motor to swing with the advancing tube, while the cutter is in action, and to move in the contrary direction when the cutter is out of action.

It is to be observed that the several parts are so proportioned that the bodily rotation of the spool D is at the same rate as the rotation of the tube by the bight of the belt, and that in the particular machine illustrated the cutter operates once in each revolution of the shaft A, and still further it may be noted that by using the independent cutter motor a relatively very high speed of the cutter may be maintained.

What I claim is:

1. The combination with an endless belt having in one fold a bight adapted to wind a stock strip spirally upon a foundation tube lying in the bight and to draw forward the compound tube so formed, of a second axially rotatable stock strip, and means acting upon one face only of the second strip to roll it laterally as it advances toward said bight, into an internally unobstructed foundation tube and to resist its lateral displacement.

2. The combination with a strip carrying spool mounted to rotate upon its own axis and upon an axis perpendicular thereto, of a fixed former ring, larger than the proposed tube, in the line of the second axis, a second fixed former ring more distant from the spool and adapted to compress the rolled strip coming through the first ring until, its edges abutting, it forms a foundation tube, means for supplying a glued covering strip obliquely to the foundation tube, an endless belt having one fold passing around the covered tube, means for causing said belt to rotate and advance the covered tube, and means for rotating the spool upon its second axis at the speed of the tube's rotation.

3. The combination with a strip carrying spool mounted to rotate upon its own axis and about a second axis perpendicular thereto, means for rotating the spool about the second axis, a fixed ring for laterally rolling the strip coming from the spool to form a foundation tube, an oblique endless belt having a bight of one fold passing around the internally unsupported foundation tube, a spool carrying a narrow stock strip revolubly mounted in position to deliver its strip to the bight of the belt, means for gumming said narrow strip, rollers resisting the lateral pull of the belt upon the tube and means for driving the belt at a speed corresponding to the speed of rotation about said second axis.

4. The combination with means for forming a tube and continuously advancing it longitudinally, of an electric motor mounted, with its shaft parallel to the path of the tube, to move parallel to the tube and to and from the same, a power shaft, a tube cutter mounted on the motor shaft, and a cam carried by the power shaft, engaging the motor, and adapted by its form to compel the motor to move periodically toward the tube, accompany its advance through a predetermined distance and to move oppositely through an equal distance.

5. The combination with a shaft having a transverse strip carrying spool revolubly mounted upon its free end, a strip rolling device in position to roll laterally to tubular form the strip drawn from said spool, means for wrapping a gummed strip spirally about the internally unsupported spirally rolled strip, a cutter carrying motor alongside the path of the wrapped structure, a power shaft, means whereby the power shaft rotates the shaft first mentioned, means whereby it actuates the wrapping mechanism, and a cam borne by the power shaft engaging said motor and adapted to compel the motor to approach the tube periodically to accompany its advance through a predetermined distance, and to move in a contrary direction through an equal distance.

In testimony whereof I affix my signature in presence of two witnesses.

CHARLES FRANCIS JENKINS.

Witnesses:
BEATRICE DAILEY,
JESSE GREEN.